United States Patent [19]

Takeda et al.

[11] 3,905,121

[45] Sept. 16, 1975

[54] DEVICE FOR INDICATING A DIRECTION ON THE EARTH'S SURFACE

[75] Inventors: Nobuhiro Takeda, Nagoya; Osamu Yanagi, Tokai; Shigeo Mizuno, Nagoya; Toyoshi Hayashi, Toki, all of Japan

[73] Assignee: Kabushiki Kaisha Tokai Rika Denki Seisakusho, Japan

[22] Filed: Feb. 25, 1974

[21] Appl. No.: 445,696

[30] Foreign Application Priority Data

Feb. 28, 1973 Japan.............................. 48-23094
Mar. 30, 1973 Japan.......................... 48-38337[U]
Mar. 30, 1973 Japan.............................. 48-36284

[52] U.S. Cl. ................................ 33/361; 324/43 R
[51] Int. Cl.² ...................................... G01C 17/30
[58] Field of Search ............. 33/361, 363; 324/43 R

[56] References Cited
UNITED STATES PATENTS

| | | | |
|---|---|---|---|
| 2,389,146 | 11/1945 | Fragola et al. ............... | 324/43 R X |
| 2,749,506 | 6/1956 | Emerson .......................... | 33/361 X |
| 3,133,244 | 5/1964 | Wojtulewicz ..................... | 33/361 |
| 3,564,402 | 2/1971 | Pittman........................... | 33/361 X |
| 3,601,899 | 8/1971 | Artz................................ | 33/361 |
| 3,696,518 | 10/1972 | Leat................................ | 33/361 |
| 3,825,823 | 7/1974 | Rovner ........................... | 33/361 |

*Primary Examiner*—William D. Martin, Jr.
*Attorney, Agent, or Firm*—Woodhams, Blanchard and Flynn

[57] ABSTRACT

A device for indicating a direction of an object on the earth's surface, comprising magneto-electric transducer means for detecting terrestrial magnetism, amplifier means for a amplifying the output of said transducer means, and indicator means for indicating a direction of the object according to the terrestrial magnetism detected by said transducer means in relation to the position of said object, upon receipt of the output from the amplifier. The thus constructed device is widely applicable, in lieu of a conventional compass, at any place and under any condition. In fact, this device is the most suitable for use in an automobile, etc.

15 Claims, 9 Drawing Figures

FIG. 9

| output of comparator ||||  luminous diode | indication |
| output of comparator 15 | output of comparator 16 | output of comparator 17 | output of comparator 18 | | |
|---|---|---|---|---|---|
| 1 | 1 | 0 | 1 | 13a | N |
| 1 | 1 | 0 | 0 | 13b | NE |
| 0 | 1 | 0 | 0 | 13c | E |
| 0 | 0 | 0 | 0 | 13d | SE |
| 0 | 0 | 0 | 1 | 13e | S |
| 0 | 0 | 1 | 1 | 13f | SW |
| 0 | 1 | 1 | 1 | 13g | W |
| 1 | 1 | 1 | 1 | 13h | NW |

DEVICE FOR INDICATING A DIRECTION ON THE EARTH'S SURFACE

This invention relates to a device for indicating a direction of an object on the earth's surface through detection of terrestrial magnetism.

Conventionally, a compass has been widely used as a device for determining directions on the earth's surface. The compass, however, is not suitable for the use under conditions subjected to continuous vibrations or use on inclined mounting bases. In fact, it is out of practical use when it is used in an automobile, etc., in the state fixed thereon.

It is therefore an object of the present invention to provide a device for indicating a direction of an object on the earth's surface, which is serviceable at any place and under any condition, permitting wide application thereof.

It is another object of the present invention to provide a device for indicating a direction of an object on the earth's surface, which is capable of indicating eight directions by using two magneto-electric transducer elements.

It is a further object of the present invention to provide a device for indicating a direction of an object on the earth's surface, which comprises a simplified circuit means to be manufactured at a reasonable cost.

According to the present invention, there is provided a device for indicating a direction of an object on the earth's surface comprising magneto-electric transducer means responsive to terrestrial magnetism to produce an electric output; amplifier means amplifying the output of said magneto-electric transducer means; and indicator means indicating a direction, by an output of said amplifier, according to the terrestrial magnetism detected by said magneto-electric transducer means in relation to the position of said object.

The invention will be better understood from the following description taken in connection with the accompanying drawings in which:

FIG. 9 is a table showing a relationship between the outputs of the comparators and the indication of the indicator means.

In the drawings and the following description, like portions or parts are denoted by like numerals or characters.

Figure 1:
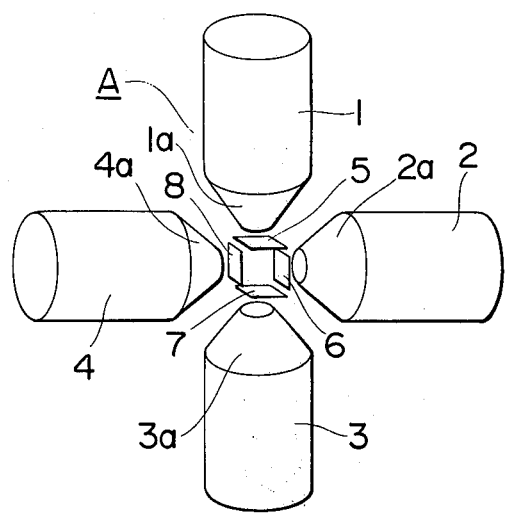
FIG. 1 is an explanatory view of one example of the terrestrial magnetism detecting section according to the present invention.
Figure 2:
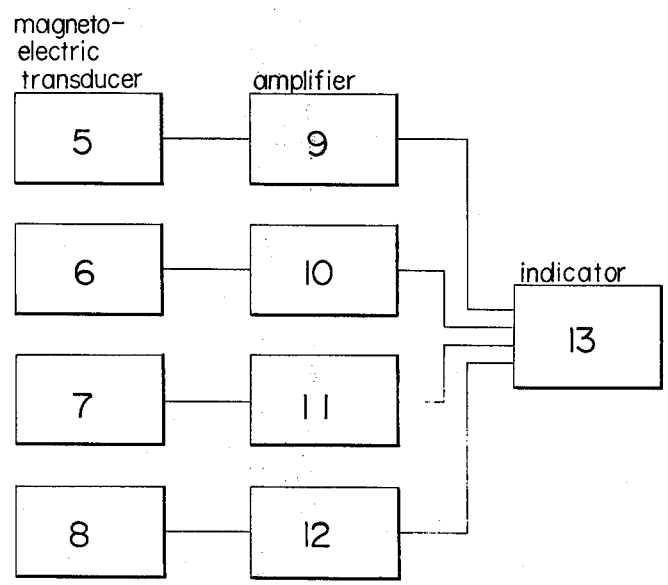
FIG. 2 is a block diagram of one form of the device according to the present invention.

Referring now to FIGS. 1 and 2, there is illustrated one embodiment of the present invention. Figure A designates a terrestrial magnetism detecting section or a magneto-electric transducer means which comprises ferromagnetic members 1, 2, 3 and 4 and magneto-electric transducer elements 5, 6, 7 and 8. Said ferromagnetic members 1 through 4 have, at their respective inner end, tapered portions 1a, 2a, 3a and 4a, respectively, which are disposed at right angles with one another in a plane. The magneto-electric transducer elements may be a Hall element, an SMD (abbreviation of trade name of a magneto-electric transducer manufactured and sold by Sony Corporation, Japan), etc., and are disposed at right angles with one another in the facing relation to the respective magneto-electric transducer elements. Each of the magneto-electric transducer elements is adapted to produce the largest output when the corresponding or associated ferromagnetic member is directed to north or faces north. Illustratively stated, when the ferromagnetic member 1 is directed to north, the tapered portion 1a can receive the largest magnetic flux to produce the largest output at the magneto-electric transducer element 5. Similarly, the largest output is produced at the transducer element 6 when the ferromagnetic member 2 is directed to north; at the transducer element 7 when the ferromagnetic member 3 is directed to north; and at the transducer element 8 when the ferromagnetic member 4 is directed to north.

Numerals 9, 10, 11 and 12 designate amplifiers which are respectively connected to the magneto-electric transducer elements 5 through 8 to amplify the outputs thereof respectively.

Numeral 13 designates an indicator means having four indicator members. Said indicator means is adapted to turn on the indicator member to show N when an output is produced from the amplifier 9 and similarly turn on the indicator members to show W, S and E respectively when outputs are produced from the amplifiers 10, 11 and 12 respectively. Said indicator means is further adapted to turn on two adjacent indicator members to show WN, SW, ES and NE upon receipt of the outputs of the two amplifiers 9 and 10, 10 and 11, 11 and 12, and 12 and 9, respectively. Though eight directions can be thus indicated by four indicator members, the indicator means may be formed to have eight indicator members to show eight directions independently by further connecting a logical circuit as mentioned later.

The operation of the thus constructed device will be explained. For example, when the terrestrial magnetism detecting section or magneto-electric transducer means A is fixed to the upper surface of an automobile's dashboard so that the ferromagnetic member 1 may face forward, the tapered portion 1a of said ferromagnetic member 1 receives the largest magnetic flux in case the automobile is running northward. Then the largest output appears at the magneto-electric transducer element 5 and it is amplified by the amplifier 9 to turn on the indicator member to show N. In case the automobile is running to westward, the ferromagnetic member 2 is directed to north and the largest magnetic flux is received by the tapered portion 2a, producing the largest output at the transducer element 6. The output is subsequently amplified by the amplifier 10 to turn on the indicator member to show W. Further, in case the automobile is running northeast, the ferromagnetic members 1 and 4 and magneto-electric transducer elements 5 and 8 detect north to produce outputs which are amplified by the amplifiers 9 and 12. The indicator members associated with said amplifiers 9 and 12 are then turned on to indicate NE. Other directions to which the automobile runs can be indicated similarly.

In the present embodiment, the magneto-electric transducer means is composed of the ferromagnetic members 1 to 4 and the magneto-electric transducer elements 5 to 8, but the ferromagnetic members may be omitted in case amplifiers having a sufficiently large amplification capability are employed.

Furthermore, though four transducer elements are employed in the present embodiment, two transducer elements disposed at right angles with each other will suffice to indicate four directions through a logical treatment and one will be sufficient to indicate only north. On the other hand, if extra transducer elements are employed, more detailed directions can be indicated.

Figure 3:
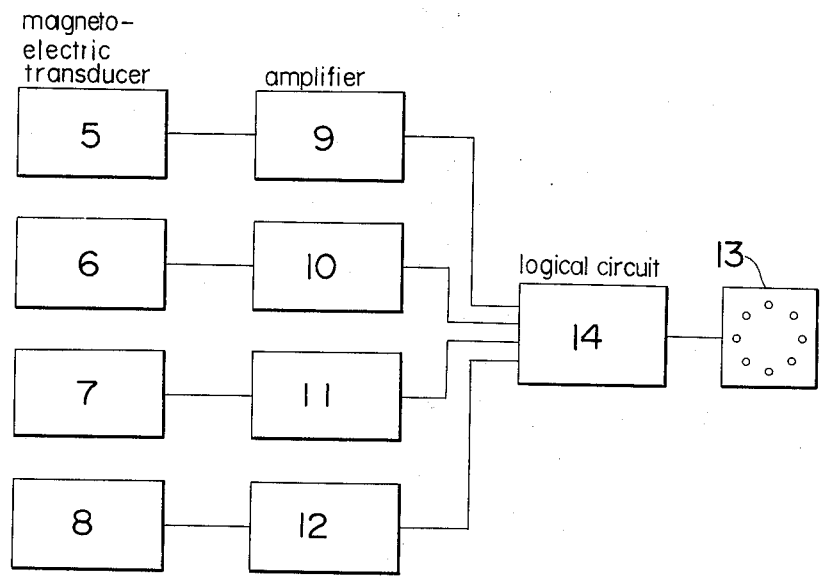
FIG. 3 is a similar block diagram of another form of the device.
Figure 4:
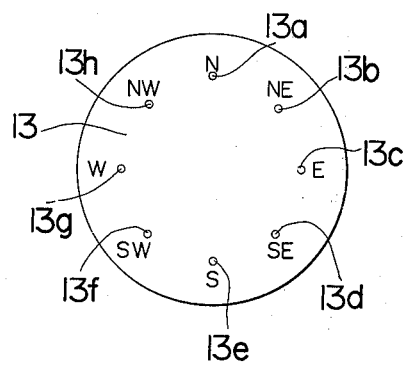
FIG. 4 is a plan view of an indicator means of the present invention.

Referring to FIGS. 3 and 4, there is illustrated another embodiment of the present invention, wherein a logical circuit 14 is connected between the amplifiers 9, 10, 11 and 12 and the indicator means 13 to produce an output selectively upon receipt of the outputs from the amplifiers 9 to 12. Said logical circuit 14 is adapted to turn on an indicator member such as luminous diode 13a to show N when an output is produced from the amplifier 9; a luminous diode 13g to show W when an output is produced from the amplifier 10; a luminous diode 13e to show S when an output is produced from the amplifier 11; a luminous diode 13c to show E when an output is produced from the amplifier 12; a luminous diode 13h to show NW when outputs are produced from the amplifiers 9 and 10; a luminous diode 13f to show SW when outputs are produced from the amplifiers 10 and 11; a luminous diode 13d to show SE when outputs are produced from the amplifiers 11 and 12, and a luminous diode 13b to show NE when outputs are produced from the amplifiers 12 and 9. The luminous diodes 13a to 13h are disposed in an annular arrangement on the indicator means 13 as shown in FIG. 4.

The operation of the thus constructed device is substantially identical with that of the first embodiment.

Figure 5:
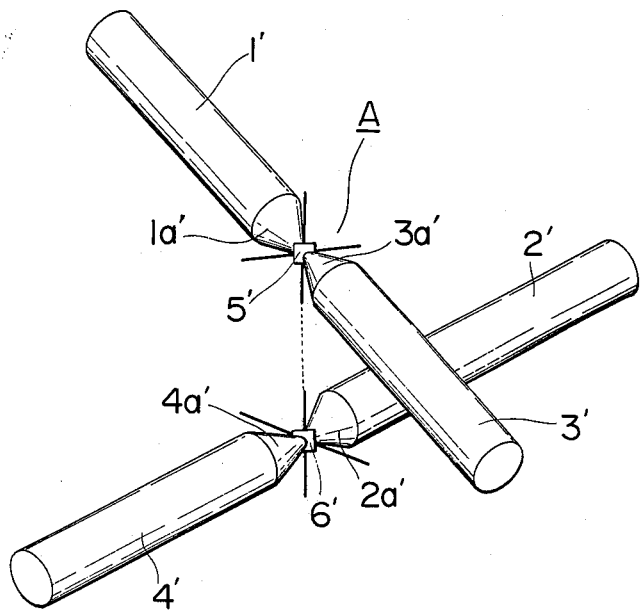
FIG. 5 is another example of the terrestrial magnetism detecting section according to the present invention.

In FIGS. 5 to 9, there is illustrated a further embodiment of the present invention. Figure A designates a terrestrial magnetism detecting section or a magneto-electric transducer means which comprises ferromagnetic members 1', 2', 3' and 4' and magneto-electric transducer elements 5' and 6'. The ferromagnetic members 1' to 4' have, at their respective inner ends, tapered portions 1a', 2a', 3a' and 4a', respectively, which are disposed at right angles with one another. The magneto-electric transducer elements 5' and 6' may be a Hall element, an SMD, etc., and are disposed to be held at right angles with each other between any two opposite ferromagnetic members 1' and 3', and 2' and 4' as depicted in FIG. 5.

In this connection, the terrestrial magnetism detecting section or magneto-electric transducer means A is mounted for example on a dashboard of an automobile so that the ferromagnetic member 1' may be directed to forward of the automobile. Each of the magneto-electric transducer elements is adapted to produce the largest output when the associated ferromagnetic member is directed to north or faces north. Illustratively stated, when the ferromagnetic member 1' faces north, the largest output appears at the magneto-electric transducer element 5'; and when the ferromagnetic member 2' faces north, the largest output is produced at the transducer element 6'.

Figure 6:
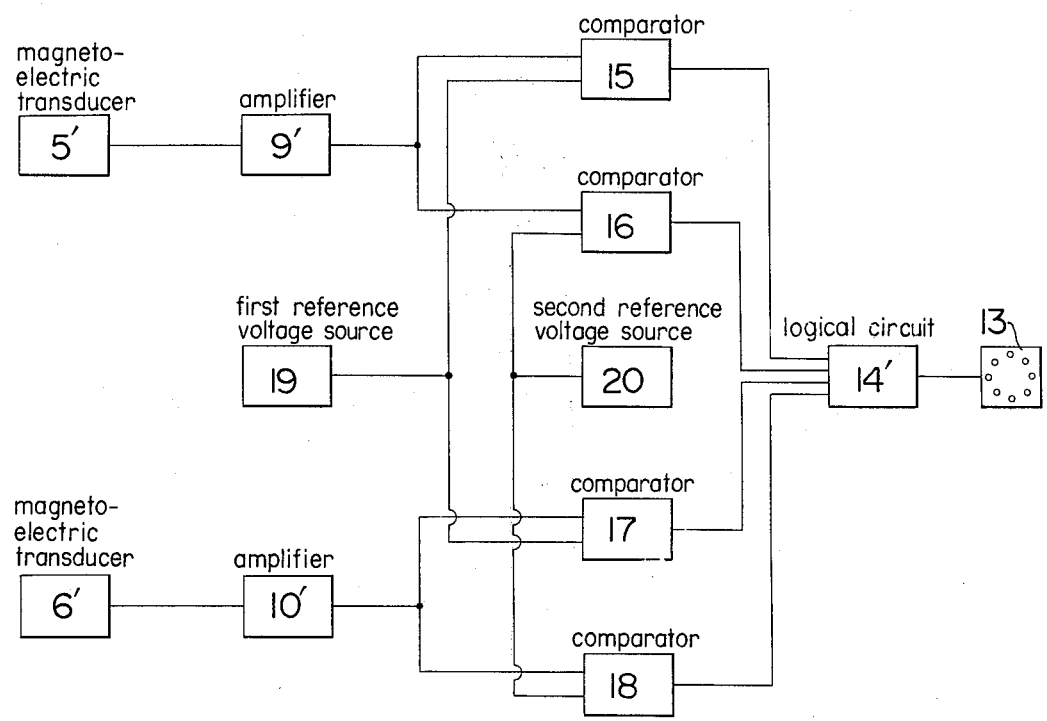
FIG. 6 is a block diagram of a further form of the device according to the present invention.
Figure 7:
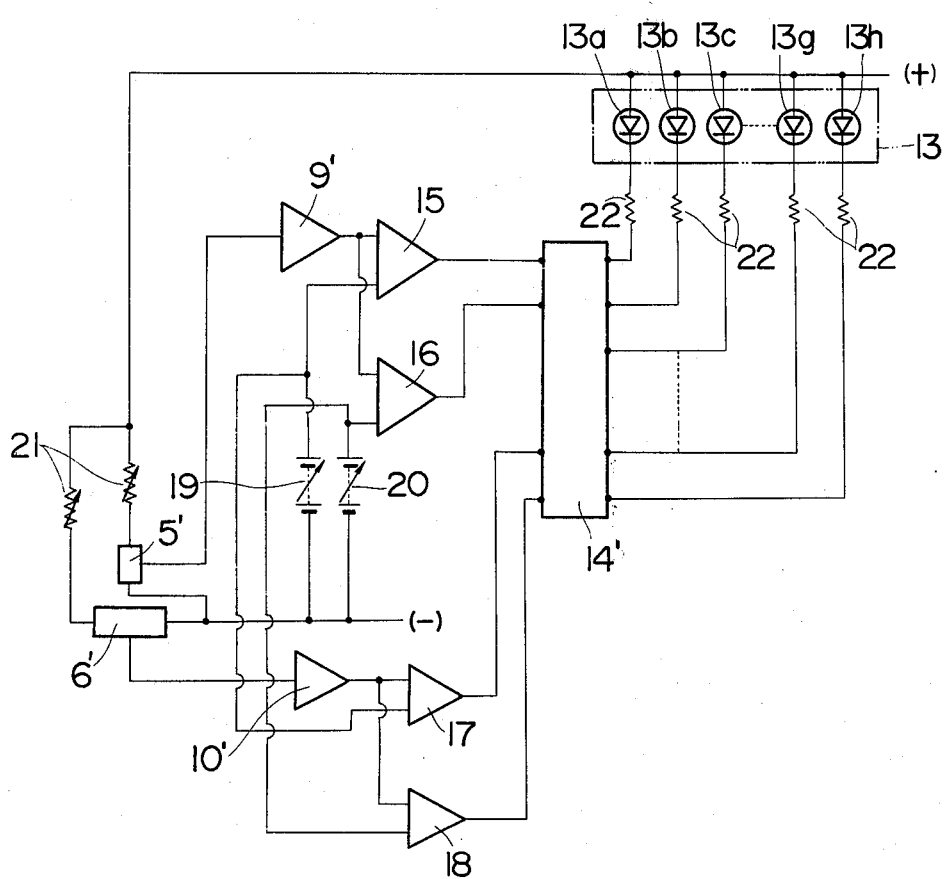
FIG. 7 is an electric circuit diagram of FIG. 6.

Numerals 9' and 10' designate amplifiers connected to voltage terminals of said transducer elements 5' and 6', respectively. Numerals 15 and 16 are comparators each including a shaping circuit and connected, at their respective input terminal, to an output terminal of the amplifier 9'. The comparator 15 is further connected, at its input terminal, to a first reference voltage source 19, and the comparator 16 to a second reference voltage source 20 as shown in FIGS. 6 and 7. Numerals 17 and 18 are comparators having respective shaping circuits and connected at their respective input terminals to an output of the amplifier 10', and further to the first reference voltage source 19 and the second reference voltage source 20, respectively. A logical circuit 14' is adapted to produce an output selectively upon receipt of output signals from the comparators 15, 16, 17 and 18. An indicator means 13 has indicator members such as luminous diodes 13a through 13h disposed in an annular arrangement on the indicator means 13 as shown in FIG. 4.

Said logical circuit 14' is adapted to turn on the luminous diode 13a to show direction N when outputs of comparators 15, 16 and 18 are applied and turn on the luminous diode 13b to show direction NE when output signals are applied from the comparators 15 and 16. Thus, the logical circuit 14' functions to turn on the luminous diodes 13a through 13h according to the patterns of the combinations of outputs of the comparators 15 through 18 as shown in FIG. 9.

In the circuit, there are further connected current-limiting resistors 21 to regulate the output of the magneto-electric transducer elements 5' and 6' to the same level and resistors 22 for controlling a current to be supplied to the luminous diodes 13a through 13h.

Figure 8:
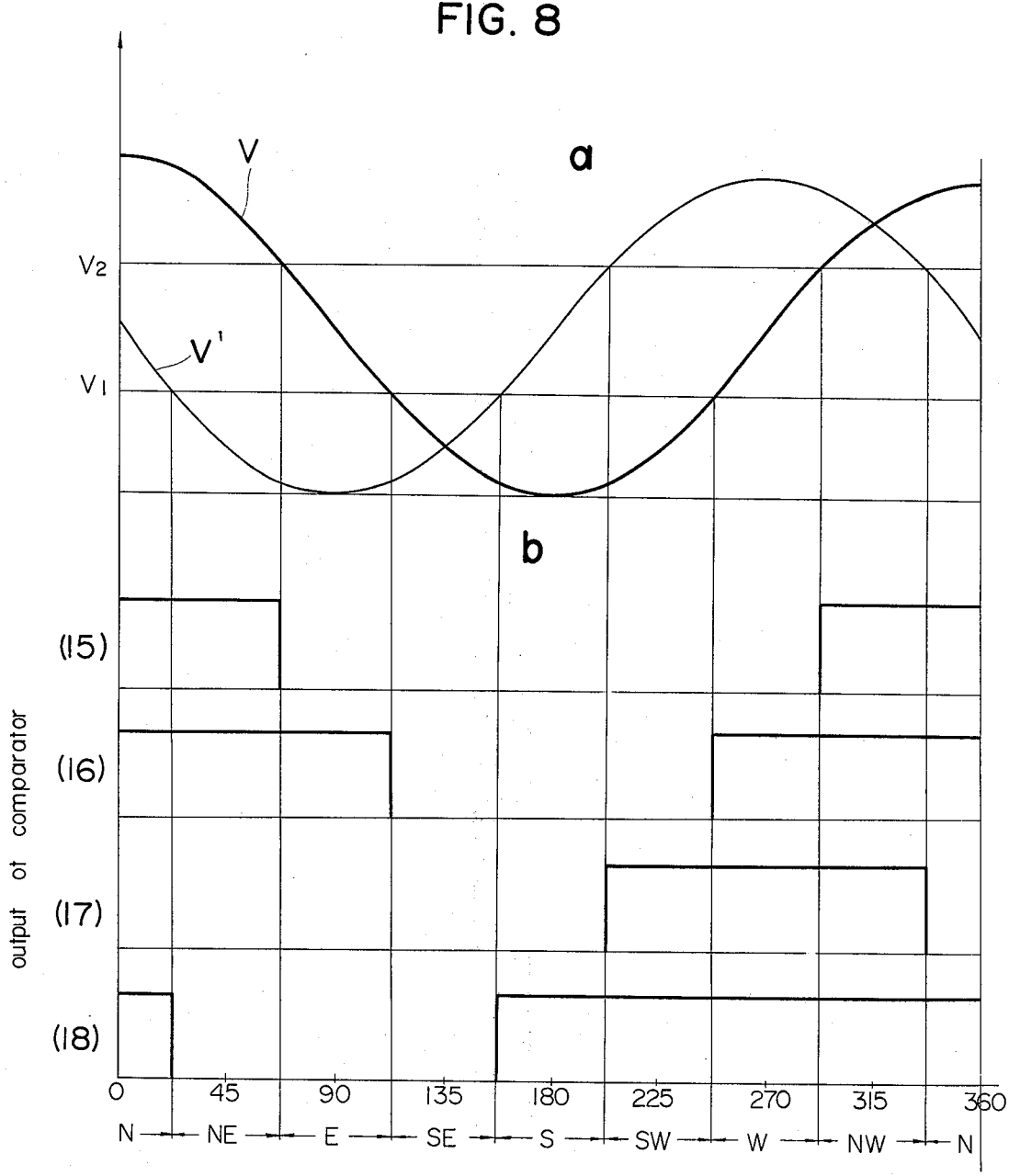
FIG. 8 is a diagram showing waveforms of outputs from amplifiers and comparators of FIG. 7.

The operation will be explained referring to FIGS. 8 and 9. When the terrestrial magnetism detecting section or magneto-electric transducer means A is rotated, output voltages V and V' of sinusoidal waveform as shown in FIG. 8a are produced by the amplifiers 9' and 10', respectively according to its rotation. There is a phase difference of 90° between these voltages V and V' since the transducer elements 5' and 6' are disposed at right angles with each other.

If a voltage of the first reference voltage source 19 is selected to be $V_2$ and a voltage of the second reference voltage source 20 is selected to be $V_1$, an output is produced from the comparator 15 in case the voltage V of the output from the amplifier 9' is higher than $V_2$; and an output is produced from the comparator 16 in case the voltage V is higher than $V_1$. Similarly, an output appears at the comparator 17 when the voltage V' of the output of the amplifier 10' is higher than $V_2$; and an output appears at the comparator 18 when the voltage V' is higher than $V_1$. The thus obtained outputs of the comparators 15, 16, 17 and 18 are shown in FIG. 8b.

Thus, it will be seen that outputs are produced at the comparators 15, 16 and 18 at an original position of the terrestrial magnetism detecting section A (at a position of rotational angle 0°) and that the logical circuit 14' receives the outputs from the comparators 15, 16 and 18 to turn on the luminous diode 13a showing N. Thus it can be seen that the automobile is directed to or faces north at this instant. At a position of rotational angle 45°, outputs are produced by the comparators 15 and 16 and the luminous diode 13b showing NE is turned on through the logical circuit 14'. Similarly, the outputs of the comparators 15, 16, 17 and 18 are discriminated by the logical circuit 14' according to the table of FIG. 9 to turn on the particular one of the luminous diodes selected.

The direction of the automobile on the earth's surface is thus indicated on the indicator means 13 by the luminous diodes 13a through 13h.

The indicator means 13 may alternatively include other tape of electrical lighting members such as electric pilot bulbs, or electrical illumination figure members which are adapted to indicate figures N, NE, etc., by themselves, in lieu of luminous diodes.

Though in the present invention, only two reference voltage source means are employed to indicate eight directions, more detailed indication can be realized by connecting more reference voltage sources. In this case, the indication of the directions can also be effected through a logical circuit according to the patterns of the combination of the outputs from the comparators and the number of said patterns may preferably be $2^n$.

What is claimed is:

1. A device for indicating a direction of an object on the earth's surface comprising magneto-electric transducer means responsive to terrestrial magnetism to produce an electric output; amplifier means amplifying the output of said magneto-electric transducer means; and indicator means indicating a direction, by an output of said amplifier, according to the terrestrial magnetism detected by said magneto-electric transducer means in relation to the position of said object, wherein said magneto-electric transducer means has four magneto-electric transducer elements disposed at right angles with one another and said indicator means has four indicator members thereby to indicate eight directions.

2. A device as claimed in claim 1, wherein said four magneto-electric transducer elements provide four parallel amplifier outputs and said indicator means has eight indicator members, said device further comprising logical circuit means responsive to each of eight discrete patterns of said four parallel amplified outputs for actuating a respective one of said indicator members thereby to indicate eight directions independently.

3. A device as claimed in claim 2, wherein said magneto-electric transducer means further has four ferromagnetic members disposed at right angles with one another with partly tapered inner ends adjacent and facing respective magneto-electric transducer elements and substantially cylindrical outer end portions extending away from the respective transducer elements.

4. A device for indicating a direction of an object on the earth's surface comprising magneto-electric transducer means responsive to terrestrial magnetism to produce an electric output; amplifier means amplifying the output of said magneto-electric transducer means; and indicator means indicating a direction, by an output of said amplifier, according to the terrestrial magnetism detected by said magneto-electric transducer means in relation to the position of said object, wherein said magneto-electric transducer means includes at least two magneto-electric transducer elements disposed at right angles with each other, said device further comprising comparator means comparing outputs of said magneto-electric transducer elements with at least two reference voltages; and logical circuit means forming patterns of combinations of outputs of said comparators, the number of said patterns being $2^n$.

5. A device as claimed in claim 4, wherein said magneto-electric transducer means further has at least four ferromagnetic members disposed at right angles with one another a said magneto-electric transducer elements being disposed between each two opposite ferromagnetic members.

6. A device as claimed in claim 5, wherein said ferromagnetic member has a tapered inner end portion in facing one side of the corresponding said magneto-electric transducer element.

7. A device as claimed in claim 5, wherein said indicator members comprise an array of luminous diodes.

8. A device as claimed in claim 1, wherein said transducer elements each comprise a Hall element, said electrical output thereof being a DC voltage variable in amplitude level with the turning of said object in the earth's magnetic field, said amplifying means comprising four amplifiers respectively connecting said elements each to a respective said indicator member.

9. A device as claimed in claim 4, wherein said indicator means has plural indicator members, the transducer elements each having an output variable In level by turning of said object through different directions on the earth's surface, said comparator means having parallel output lines which in number are a multiple of the number of transducer elements, said parallel output lines being connected to corresponding parallel inputs of said logic circuit means and together carrying a different pattern of comparator output signal levels for each of several directions in which said object can be faced, the number $2^n$ of patterns being a multiple of the number of said comparator output lines, and $n$ being an integer, there being at least one discrete pattern for each indicator member and a discrete and corresponding logic circuit means output connection to each said indicator member.

10. A device for indicating, in response to terrestrial magnetism, the direction of an object on the earth's surface, comprising:

a terrestrial magnetism detector fixed on the object and including at least a pair of magneto-electric transducer elements fixed to face at right angles to each other and each having a voltage varied by turning of the object in the earth's magnetic field;

said magneto-electric transducer elements each comprising a Hall element, the voltage level of which is at a maximum when said Hall element is facing in one direction along the earth's magnetic field, the voltage levels of the two elements being displaced 90° in phase as the object turns, said detector further including an aligned pair of elongate ferromagnetic members of cross-sectional size exceeding the width of the Hall element and extending in opposite directions from opposite faces of each of the said pair of Hall elements, said ferromagnetic members each having a partially tapered inner end adjacent the opposed face of corresponding Hall element, the one pair of ferromagnetic members being disposed at right angles to the other pair of ferromagnetic members;

indicator means having a plurality of indicator members each corresponding to a different direction of said object; and circuit means coupling said transducer elements to said indicator members for actuating a preselected indicator member in response to a uniquely corresponding pattern of said transducer element output voltage levels.

11. A device as claimed in claim 10 wherein said circuit means includes means connected to the outputs of said elements and having four parallel output paths and responsive to said element voltage for producing on said output paths a different pattern of signals for each of at least eight substantially evenly angularly spaced directions in which said object can face, said indicator members being arranged in a display sequence corresponding to the sequence of directions assumed by said detector in a rotation of said object substantially in the plane of the earth's magnetic field; and logic circuit means having a respective output line to each said indicator member and having inputs coupled to said four output paths and responsive to each said different signal pattern for actuating a different indicator member;

whereby the instantaneous orientation of the object on the earth's surface is indicated by at least one corresponding said indicator member.

12. A device as claimed in claim 11 wherein the means including four parallel output paths comprises an amplifier receiving the variable electrical output of a corresponding Hall element and having a corresponding output voltage variable with the orientation of said corresponding element, the output voltages of the two amplifiers having a 90° phase difference corresponding to the orientation of said Hall elements at right angles to each other.

13. A device as claimed in claim 11 in which said means including four parallel output paths includes four comparators respectively connected to said output paths and a pair of reference voltage sources of differing level each coupled to reference inputs of a respective pair of said comparators, the output of each transducer element being coupled to a remaining input of one comparator of each said pair.

14. A device as claimed in claim 13 in which said comparators include shaping circuitry and each provide alternative outputs at logic 1 and logic 0 levels to define said pattern of signals, said logic circuit means being a logic circuit of the type capable of actuating a respective one of its output lines for each distinct pattern of logic 1 and 0 signals applied to the parallel inputs thereof.

15. A device according to claim 14 in which said indicator members comprise luminous diodes coupled to the respective logic circuit output actuated in response to facing of the detector in the direction to be indicated by said diode.

* * * * *